United States Patent [19]

Ulanowski

[11] Patent Number: 5,225,929
[45] Date of Patent: Jul. 6, 1993

[54] DEVICE FOR PRODUCING A LIGHT SPOT IN A MICROSCOPE

[75] Inventor: Zbigniew J. Ulanowski, Hatfield, United Kingdom

[73] Assignee: University of Hertfordshire, United Kingdom

[21] Appl. No.: 793,631

[22] Filed: Nov. 18, 1991

[51] Int. Cl.$^5$ ............... G02B 27/14; G02B 21/06
[52] U.S. Cl. ............... 359/389; 359/385; 359/390; 219/121.78
[58] Field of Search ............... 359/389, 390, 385; 351/224; 219/121.78, 121.79, 121.80

[56] References Cited

U.S. PATENT DOCUMENTS 3,460,880 8/1969 Henderson .
4,279,478 7/1981 Matsumura ............... 351/224
4,523,799 6/1985 Delhaye et al. .

FOREIGN PATENT DOCUMENTS

2443167A1 9/1974 Fed. Rep. of Germany .

Primary Examiner—Jon W. Henry
Attorney, Agent, or Firm—Davis, Bujold & Streck

[57] ABSTRACT

A microscope is provided with a supplementary means for producing a light spot in the object plane of the microscope objective lens. The supplementary means comprises a light source from which a collimated light beam is derived, a focusing lens receiving the collimated beam and a coupling lens disposed between the first lens and the objective lens. The supplementary means has the following features: the focal point of the focusing lens is in the plane of the image of a specimen in the object plane as obtained through the objective lens and the coupling lens, the light beam fills the clear aperture of the objective lens without substantial light loss and the light source and the focusing lens may be moved together to displace the light spot within or away from the object plane of the objective lens.

4 Claims, 3 Drawing Sheets

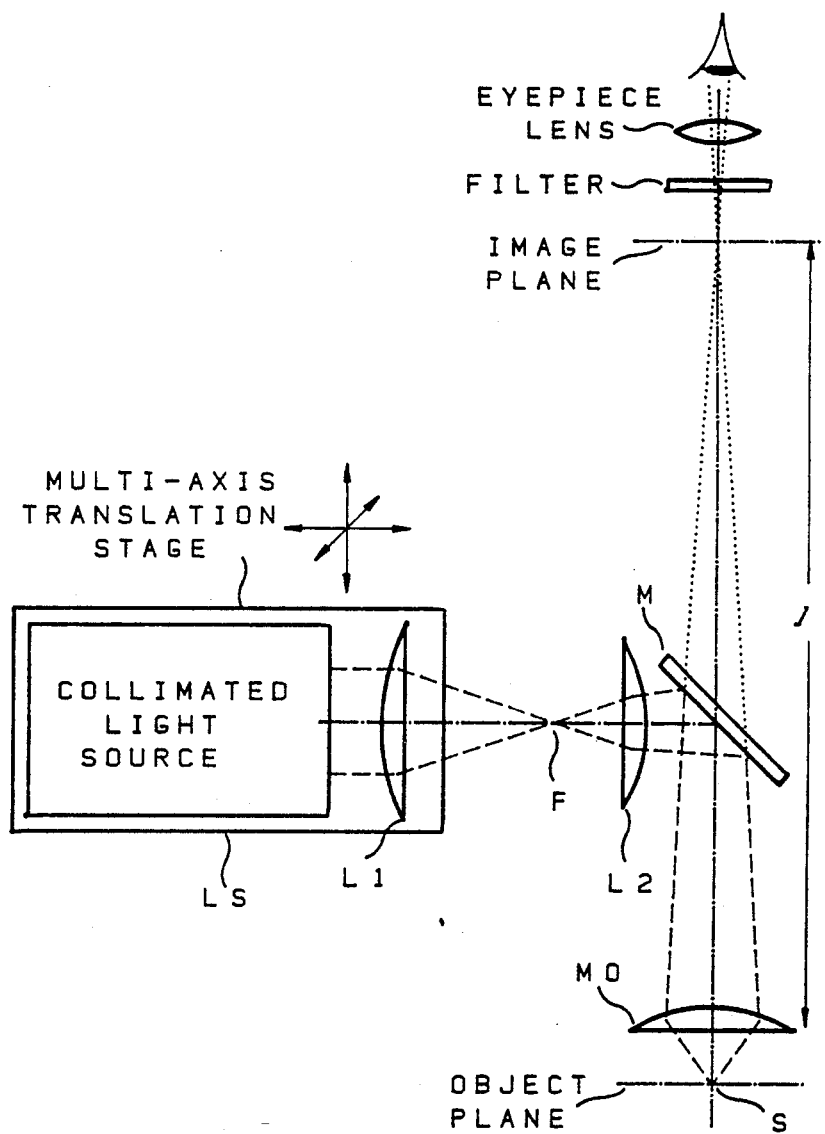

DEVICE FOR PRODUCING A LIGHT SPOT IN A MICROSCOPE

TECHNICAL FIELD

This invention relates to optical microscopes having supplementary means for delivering a beam of light into their optical path so that the beam is focused into a small spot in the object plane of the microscope objective lens and the spot can be moved freely within the object plane.

BACKGROUND OF THE INVENTION

In certain applications involving the use of optical microscopes there arises a need to focus a small spot of light on to a specimen under observation. Possible uses include irradiating small specimens with laser light or trapping microparticles in optical gradient force traps. Such spots can be obtained by introducing light from a secondary source such as a laser into the optical path of the microscope and using the objective lens to focus the light. Additionally, some means of manipulating the position of the light spot within the field of view of the microscope should be provided.

Efficient focusing of light into a small spot requires utilization of the whole clear aperture of the lens used for the focusing. For example, in the case of a gaussian beam of light the size D of the spot will be:

$$D = 4\lambda f / \pi \phi \qquad (1)$$

where
$\lambda$—wavelength of light
f—focal length of the lens
$\phi$—beam diameter at the lens.

A beam narrower than the aperture would not produce a spot of the minimum (i.e. diffracion limited) size. A wider beam would result in a loss of light power. These considerations apply regardless of the position of the spot, i.e. whether it is displaced away from the optical axis or not.

SUMMARY OF THE INVENTION

A microscope is provided with a supplementary means for producing a movable light spot in the object plane of the microscope objective lens. The supplementary means comprises a light source from which a collimated light beam is derived, a focusing lens receiving the collimated beam and a coupling lens disposed between the first lens and the objective lens. The supplementary means has the following features: (i) the focal point of the focusing lens is in the plane of the image of a specimen in the object plane as obtained through the objective lens and the coupling lens; (ii) the light beam fills the clear aperture of the objective lens without substantial light loss; (iii) the light source and the focusing lens may be moved in a plane perpendicular to the optical axis to displace the light spot within the object plane of the objective lens, the parameters of the system are such that the axial ray of light from the light source always passes through the nodal points of the objective lens. Further, the focusing lens and the light source may be movable parallel to the optical axis.

BRIEF DESCRIPTION OF THE DRAWINGS

The invention will now be further explained with reference to the FIG. 1 of the accompanying annotated drawings. FIGS. 2 and 3 of the drawings show modifications of the embodiment in FIG. 1.

Figure 2:
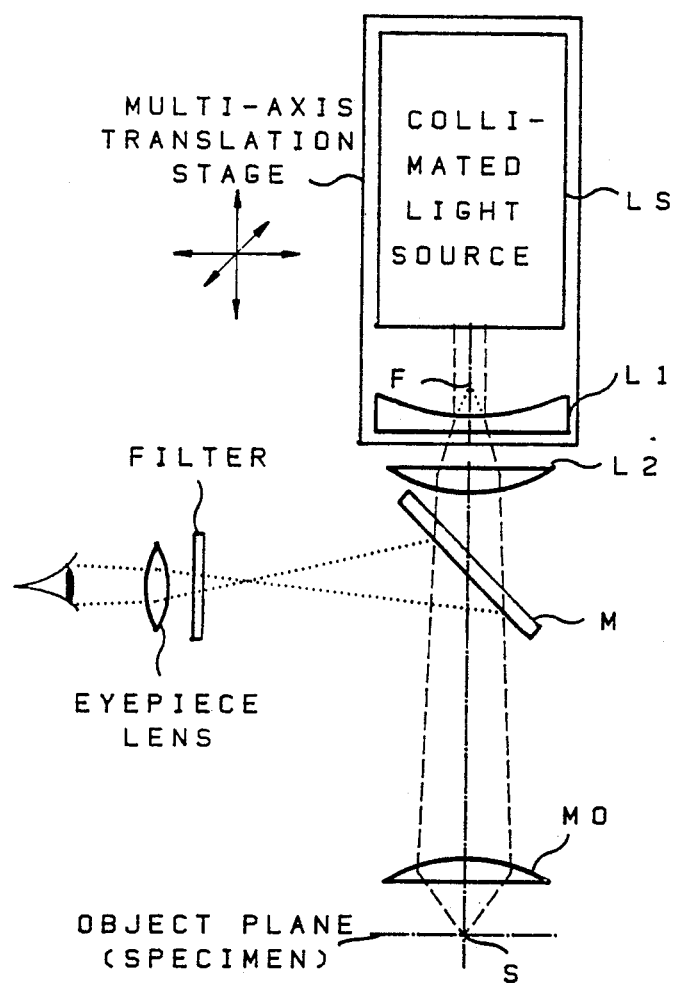

In the embodiment in FIG. 2 a negative power lens is used instead of a positive lens.

In the embodiment in FIG. 3 the viewing path of the microscope and the supplementary beam path have been interchanged.

DETAILED DESCRIPTION

According to the invention a microscope is provided with a supplementary means for producing a light spot S in the object plane of the microscope objective lens, the means comprising a light source LS from which a collimated light beam is derived, a focusing lens L1 receiving the collimated beam and a coupling lens L2 dispose between said first lens L1 and the objective lens MO whereby a light spot is produced from said collimated beam in the object plane of the objective lens MO, (i) the focal point F of the focusing lens L1 being in the plane of the image of a specimen in said object plane as obtained through the objective lens MO and the coupling lens L2, (ii) the light beam filling the clear aperture of the objective lens MO without substantial light loss and (iii) the focusing lens L1 being movable together with the light source LS in a plane perpendicular to its axis to displace the light spot S in the object plane of the objective lens MO, the parameters of the system being such that the axial ray of light from said light source always passes through the nodal point of the objective lens MO.

The focusing lens L1 may additionally be capable of limited movement parallel to is axis so that the light spot S is displaced a short distance from the object plane of the objective lens MO.

It was pointed out above that in order to efficiently focus light into a small spot one should utilise the whole clear aperture of the lens used for focusing (see formula (1)). In the present invention the requirements of minimizing the spot size while maintaining maximum optical power throughput in the sysstem are met by ensuring that, regardless of the position of the light spot:

(a) the beam is expanded to just fill the clear aperture of the objective lens;
(b) the axial ray of light emerging from the light source passes through the nodal point of the objective lens.

Further, the focal point F of the focusing lens L1 is arranged in the plane of the image of the specimen as obtained through the objective lens MO and the coupling lens L2. This has the effect of adapting a parallel beam of light to those microscope objective lenses having finite conjugate ratio by making the beam divergent.

The optical system thus has the following features:

1. The focal point F of the focusing lens L1 as stated above is in, or close to, the plane of the image of the specimen in the objective lens MO and the coupling lens L2. If the lens L1 is a positive one the focal point F is the second (rear) focal point; if it is a negative one the focal point F (virtual) is the front focal point.

2. The light beam fills the whole aperture of the microscope objective lens MO, irrespectively of the deflection of the beam. This is achieved by ensuring that the nodal point of the microscope objective lens MO coincides closely with the rear focal point of the coupling lens L2.

3. The mirror M allows viewing the specimen and is such that it reflects a substantial part of the visible light originating from the specimen and transmits a substantial part of the light emitted by the light source LS.

4. The light source LS and the focusing lens L1 assembly can be moved as a unit in the plane perpendicular to the optical axis of the assembly whereby the focused light spot S is moved within the object plane of the microscope by an amount proportional to but generally smaller than the displacement of the assembly. If desired the assembly may also be made capable of displacement parallel to the axis, the displacement resulting in a respective displacement of the light spot S away from the object plane.

The formulae for the system may be derived as follows. It is assumed that all distances are measured between appropriate principal points of the lenses.

The diameter $\phi_2$ of the laser beam in the plane of the coupling lens L2 is described by:

$$\phi_2 = \phi_1(d/|f_1| - 1) \qquad (2)$$

where:
$\phi_1$—original diameter of the laser beam
d—distance between the lenses L1 and L2
$f_1$—focal length of the lens L1. Note that $f_1$ is negative for a negative power lens (FIG. 2).

The virtual image of the focal point F in the lens L2 is formed at the distance l from the objective lens MO (see FIG. 3). Because the distance between L2 and MO is equal to $f_2$ the lens equation for the lens L2 takes the form:

$$1/f_2 = 1/(d - f_1) - 1/(l - f_2) \qquad (3)$$

The diameter $\phi$ of the beam in the plane of the lens MO is:

$$\phi = \phi_2/(1 - f_2/l) \qquad (4)$$

By combining equations (2), (3) and (4) we obtain the expression:

$$f_2/|f_1| = \phi/\phi_1 \qquad (5)$$

which allows choosing the focal lengths of the lenses given the collimated beam diameter and the diameter $\phi$ which is determined by the size of the clear aperture of the objective lens MO. The latter can be calculated with the aid of the approximate formula:

$$\phi = 2Nf_3/n \qquad (6)$$

where N and $f_3$ are, respectively, the numerical aperture and the focal length of the objective lens MO and n is the refractive index of the medium. It must be remembered that the focal length $f_2$ determines the distance between the coupling lens L2 and the objective lens MO. Having chosen the focal lengths, one can obtain the distance d between the focusing lens L1 and the coupling lens L2 from the formula (2) (note again that $f_1$ can be either positive or negative, depending on the type of the lens L1). The length l is approximately equal to the object-to-image distance of the microscope (usually 195 mm) less the focal length $f_3$ of the objective lens.

The above formulae are also valid for the limiting case of "infinity optics" microscopes where the length l is infinite.

Figure 1:
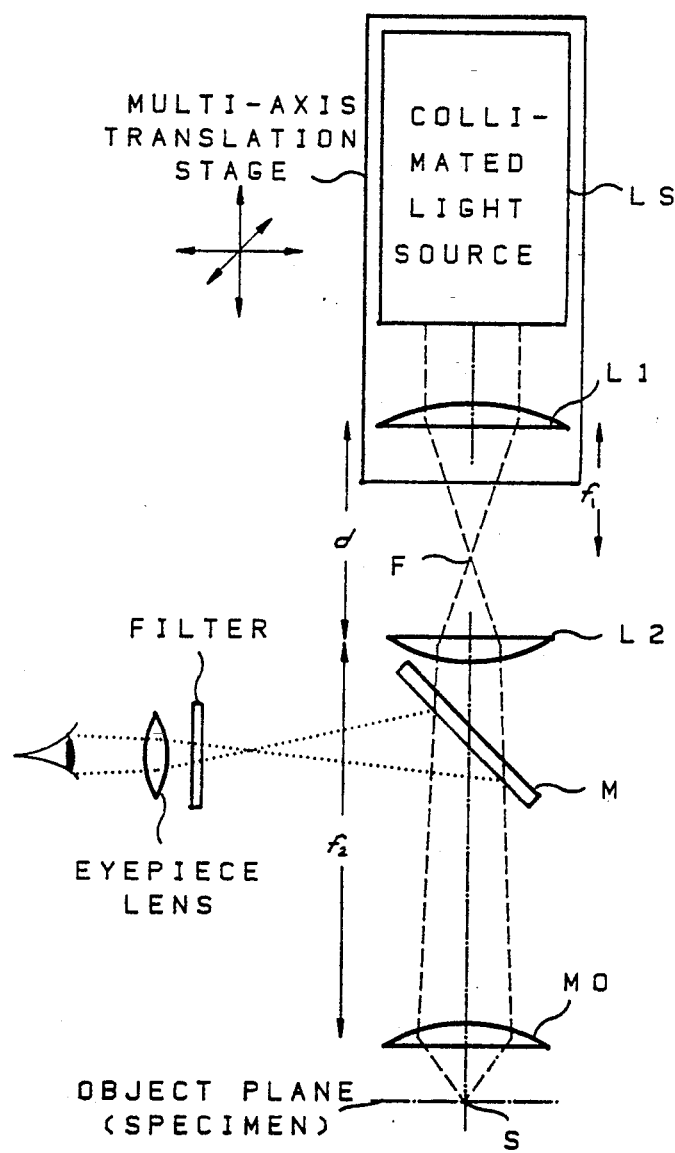

In a modification of the present invention shown in FIG. 3 the viewing path and supplementary beam path have been interchanged as compared with FIG. 1. Therefore, the mirror M should transmit a substantial part of the visible light originating from the specimen and reflect a substantial part of the light emitted by the light source LS.

In a further modification the mirror M can be such that it reflects the majority of the visible light (used for viewing) and transmits the majority of the laser light (used for producing the light spot) in the case of the embodiment shown in FIG. 1. Again, the reverse should be the case for the embodiment shown in FIG. 3. The above can be accomplished with the aid of an interference filter or a dichroic mirror designed for oblique incidence. Such a mirror can be chosen to transmit and reflect only at desired wavelength ranges and thus separate the viewing path from the laser light path more efficiently.

If a high-power light source (e.g. producing invisible radiation) is used additional protection to the viewer can be afforded by placing a blocking filter between the mirror M and the eyepiece of the microscope.

We claim:

1. A microscope provided with supplementary means for producing a light spot in the object plane of the microscope objective lens
said means comprising
a focusing lens receiving said collimated beam, said focusing lens having a focal point; and
a coupling lens disposed between said focusing lens and said objective lens whereby said light spot is produced from said collimated beam in said object plane of said objective lens;
said means further characterized in that
said focal point of said focusing lens is in the plane of the image of a specimen in said object plane as obtained through said objective lens and said coupling lens;
said light beam fills the clear aperture of said objective lens without substantial light loss;
said focusing lens is movable together with said light source in a plane perpendicular to the axis of said lens whereby said light spot is displaced in said object plane of said objective lens; and
the central ray of light from said light source passes through the center of said clear aperture of said objective lens.

2. A microscope as defined in claim 1, characterised in that said focusing lens and said light source are movable together parallel to said axis.

3. A microsocpe as defined in any one of the claims 1 or 2, characterized in that said center of said clear aperture of said microsocpe objective lens coincides with the rear focal point of said coupling lens.

4. A microscope as defined in claim 1, characterised in that
said light source is a laser source;
a light-splitting mirror characterised by wavelength-dependent reflectance is disposed between said coupling lens and said objective lens; and
the light from said laser source and the visible light from said specimen in said object plane have a common path between said mirror and said objective lens and the majority of one of said lights is transmitted by said mirror while the majority of said other light is reflected by said mirror.

* * * * *